United States Patent
Khoshkava et al.

(10) Patent No.: US 10,381,143 B2
(45) Date of Patent: Aug. 13, 2019

(54) MAGNETO-SENSITIVE ELASTOMERS FOR HAPTIC FEEDBACK

(71) Applicant: IMMERSION CORPORATION, San Jose, CA (US)

(72) Inventors: Vahid Khoshkava, Montreal (CA); Mansoor Alghooneh, Montreal (CA)

(73) Assignee: IMMERSION CORPORATION, San Jose, CA (US)

(*) Notice: Subject to any disclaimer, the term of this patent is extended or adjusted under 35 U.S.C. 154(b) by 430 days.

(21) Appl. No.: 15/362,122

(22) Filed: Nov. 28, 2016

(65) Prior Publication Data

US 2018/0151281 A1 May 31, 2018

(51) Int. Cl.
| | |
|---|---|
| H01F 7/06 | (2006.01) |
| H01F 27/255 | (2006.01) |
| G08B 6/00 | (2006.01) |
| H01F 27/28 | (2006.01) |
| F16F 15/03 | (2006.01) |
| F16F 1/36 | (2006.01) |
| G06F 3/01 | (2006.01) |

(52) U.S. Cl.
CPC .............. *H01F 7/064* (2013.01); *F16F 1/361* (2013.01); *F16F 15/03* (2013.01); *G06F 3/016* (2013.01); *G08B 6/00* (2013.01); *H01F 27/255* (2013.01); *H01F 27/2823* (2013.01); *H01F 27/2828* (2013.01)

(58) Field of Classification Search
CPC . F16F 15/03; G06F 3/016; G08B 6/00; H01F 27/255; H01F 27/2823; H01F 27/2828; H01F 7/064

USPC .......................................................... 361/142
See application file for complete search history.

(56) References Cited

U.S. PATENT DOCUMENTS

| | | | |
|---|---|---|---|
| 6,982,696 B1* | 1/2006 | Shahoian | G06F 3/016 345/156 |
| 8,362,882 B2* | 1/2013 | Heubel | G06F 1/163 340/407.1 |
| 8,665,241 B2 | 3/2014 | Heubel et al. | |
| 9,058,728 B2 | 6/2015 | Fantauzza | |
| 2007/0023244 A1* | 2/2007 | Carlson | A47C 1/03 188/267 |

(Continued)

FOREIGN PATENT DOCUMENTS

| | | |
|---|---|---|
| JP | H0525316 | 2/1993 |
| WO | 2012026332 | 10/2013 |

(Continued)

OTHER PUBLICATIONS

Bellan and Bossis, "Field Dependence of Viscoelastic Properties of MR Elastomers," Int. J. Mod. Phys. B. 16:2447-2453 (2002).

(Continued)

*Primary Examiner* — Zeev V Kitov
(74) *Attorney, Agent, or Firm* — Medler Ferro Woodhouse & Mills PLLC

(57) ABSTRACT

This disclosure relates to systems and haptic actuators, and suitably haptic actuation resulting from the response to a magnetic field of magnetic particles within an elastomeric material. Such systems and haptic actuators are useful in structural materials, including as elements of wearables or accessories, as well as in other applications and devices where haptic feedback is desired.

20 Claims, 5 Drawing Sheets

(56) References Cited

U.S. PATENT DOCUMENTS

2015/0156581 A1* 6/2015 Efrati .................... H02K 33/16
                                                                                                381/98

FOREIGN PATENT DOCUMENTS

| WO | 2016090363 | 6/2016 |
|----|------------|--------|
| WO | 2016154752 | 10/2016 |

OTHER PUBLICATIONS

Palleau, et al., "Reversible patterning and actuation of hydrogels by electrically assisted ionoprinting," Nature Communications 4:2257 (2013).
Behl and Lendlein, "Shape Memory Polymers," MaterialsToday, vol. 10, pp. 20-28 (2007).

* cited by examiner

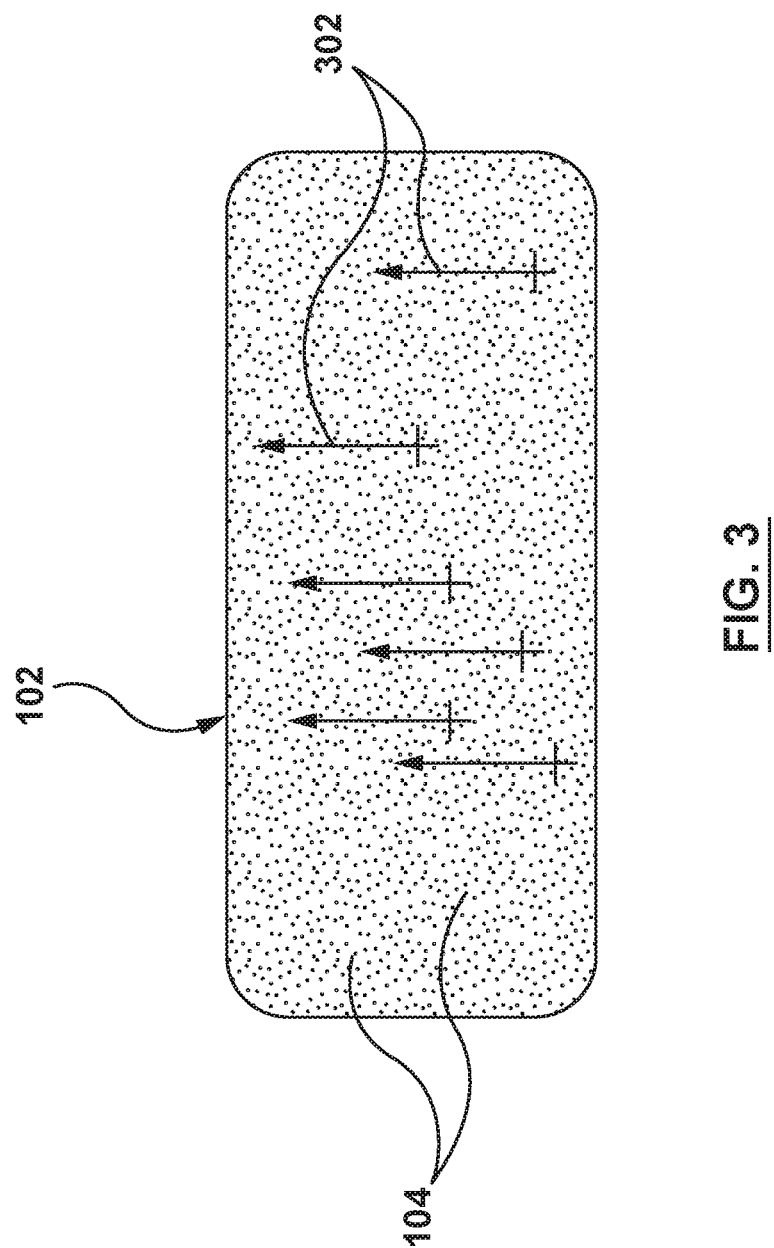

MAGNETO-SENSITIVE ELASTOMERS FOR HAPTIC FEEDBACK

TECHNICAL FIELD

This disclosure relates to systems and haptic actuators, and suitably haptic actuation resulting from the response to a magnetic field of magnetic particles within an elastomeric material. Such systems and haptic actuators are useful in structural materials, including as elements of wearables or accessories, as well as in other applications and devices where haptic feedback is desired.

BACKGROUND

Haptic feedback for use in wearables or accessories has traditionally been based on the use of eccentric rotating mass (ERM) motors and linear resonant actuators (LRA). However, these types of actuators are typically bulky and often require large amounts of power, making them difficult to integrate into clothing or other wearables or accessories (i.e., jewelry, etc.). Shape memory alloys have also been used in wearables, but again, power consumption often limits their applicability and ease of integration.

What is needed is a simple mechanism for providing haptic feedback to a user that can readily be implemented in wearables and accessory goods.

SUMMARY

This disclosure relates to systems comprising magneto-sensitive elastomers for providing haptic feedback to a user, wherein the systems for providing haptic feedback may be used in various applications, such as wearables and accessory goods.

In exemplary embodiments, provided herein are systems for providing haptic feedback to a user. In embodiments, such systems include an elastomeric material, magnetic particles dispersed in the elastomeric material, and an electromagnetic coil oriented so as to produce a magnetic field at the elastomeric material.

Also provided herein are systems for providing haptic feedback to a user, which include an elastomeric material, magnetic particles dispersed in the elastomeric material, an electromagnetic coil oriented so as to produce a magnetic field at the elastomeric material, a power supply connected to the electromagnetic coil, and a housing for containing the elastomeric material, the electromagnetic coil and the power supply.

In additional embodiments, provided herein are methods for providing haptic feedback to a user via a system which includes an elastomeric material, magnetic particles dispersed in the elastomeric material, an electromagnetic coil oriented so as to produce a magnetic field at the elastomeric material, and a power supply connected to the electromagnetic coil. The methods suitably include transmitting an activating signal to the power supply, generating a magnetic field with the electromagnetic coil, and modifying a modulus of the elastomeric material in response to the magnetic field to provide haptic feedback to the user.

BRIEF DESCRIPTION OF THE DRAWINGS

The foregoing and other features and aspects of the present technology can be better understood from the following description of embodiments and as illustrated in the accompanying drawings. The accompanying drawings, which are incorporated herein and form a part of the specification, further serve to illustrate the principles of the present technology. The components in the drawings are not necessarily to scale.

FIG. 3 shows the alignment of the magnetic polarity of magnetic particles within a system in accordance with an embodiment hereof.

DETAILED DESCRIPTION

Various embodiments will be described in detail, some with reference to the drawings. Reference to various embodiments does not limit the scope of the claims attached hereto. Additionally, any embodiments set forth in this specification are not intended to be limiting and merely set forth some of the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "has," and "having" are interchangeable and not intended to be limiting. The term "such as" also is not intended to be limiting. For example, the term "including" shall mean "including, but not limited to."

In embodiments, provided herein are systems for providing haptic feedback to a user. As used herein "haptic feedback" or "haptic feedback signal" refer to information such as vibration, texture, and/or heat, etc., that are transferred, via the sense of touch, from a system as described herein, to a user.

Figure 1B:
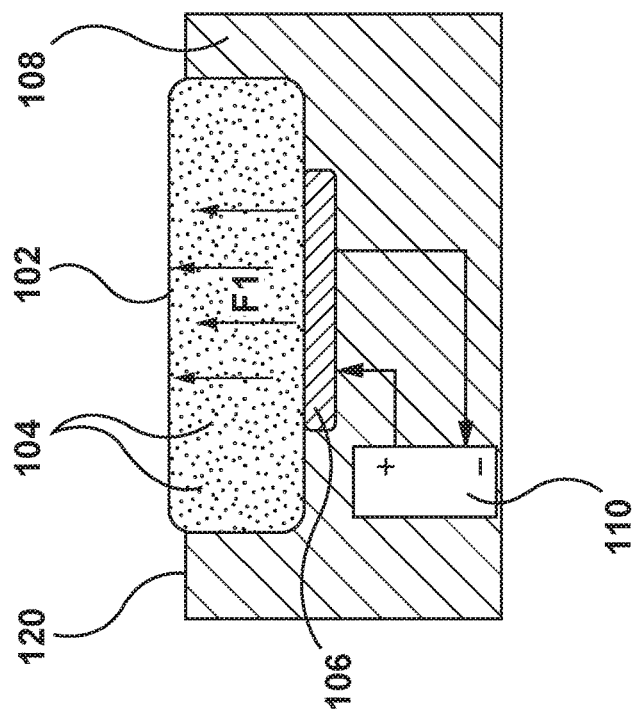
FIG. 1B shows a sectional view of the system shown in FIG. 1A, taken through line B-B, in accordance with an embodiment hereof.
Figure 1A:
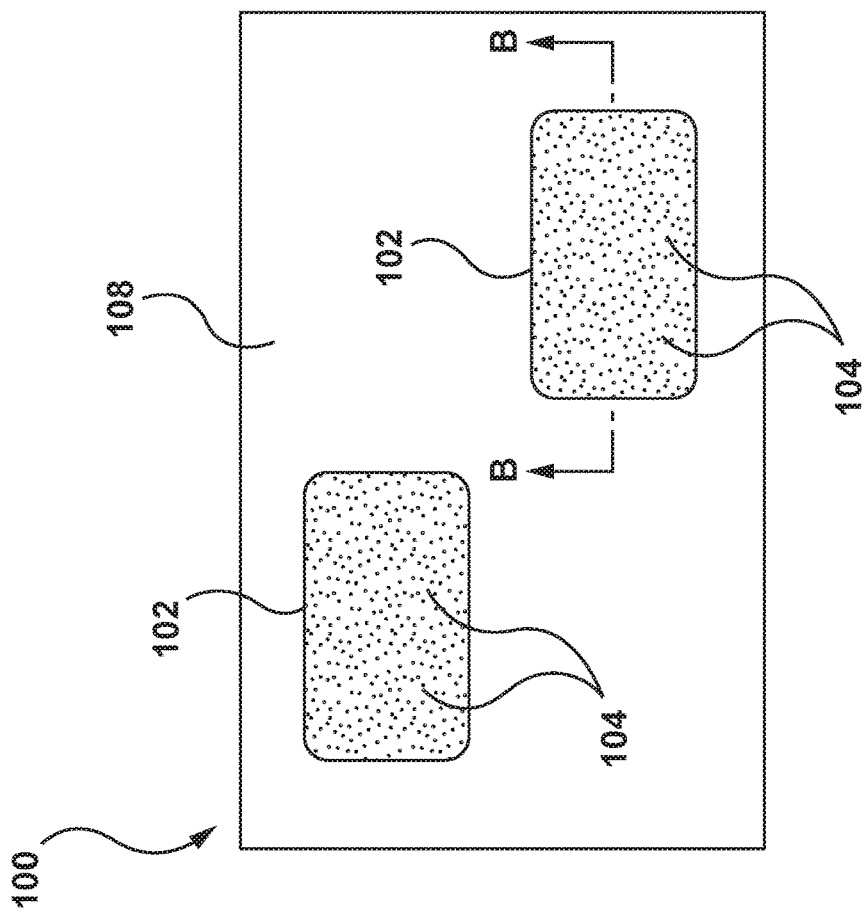
FIG. 1A shows a system for providing haptic feedback in accordance with an embodiment hereof.

In exemplary embodiments, as shown in FIG. 1A, a system 100 for providing haptic feedback to a user includes an elastomeric material 102, which has dispersed therein magnetic particles 104. Also included in system 100 is an electromagnetic coil 106 (see FIG. 1B). Electromagnetic coil 106 is oriented so as to provide a magnetic field at elastomeric material 102.

In embodiments, system 100 further comprises a housing 108, which contains elastomeric material 102 and electromagnetic coil 106. As used herein, "housing" refers to a container, device, material (including structural materials as defined herein), etc., which can be used to maintain elastomeric material 102 in a desired shape, configuration and position, so that it can be acted upon by electromagnetic coil 106.

As used herein, the term "elastomeric material" or "elastomer" refers to natural or synthetic polymers which exhibit viscoelastic as well as elastic properties, depending on the state of the magnetic particles dispersed therein, and their interaction with a magnetic field. Elastomeric materials as described herein are able to undergo nonpermanent deformation, returning to an original size and shape after strain. Generally elastomers have weak inter-molecular forces, a low Young's modulus, and high failure strain compared with other materials. Exemplary elastomeric materials for use herein include various rubbers (both natural and synthetic) as well as two component materials which may include urethanes, silicon-based materials, and acrylics. The polymeric material can be chosen from those described herein, including for example, soft polymeric materials, such as silicone, natural rubber and synthetic rubber, or a material, such as polyethylene terephthalate (PET), polycarbonate (PC) polyethylene naphthalene (PEN), silicon based polymers, polyurethanes, thermoplastics, thermoplastic-elastomers, thermosets, and polymer composites filled with natural or synthetic fillers.

As shown in FIG. 1A, housing 108 can contain more than one elastomeric material 102, including two, three, four, five, six, seven, eight, nine, 10, 15, 20, 30, 40, 50, etc., individual areas or sections of elastomeric material 102, or can contain larger sections of elastomeric material 102 which can cover or encompass a majority (i.e., more than 50%) of the surface area and/or volume of housing 108. It should be understood that while elastomeric material 102 is shown contained within housing 108, it is not necessary in all embodiments to utilize the housing, and elastomeric materials can function as described herein without the use of housing 108.

FIG. 1B shows a sectional view of system 100 taken through line B-B. As shown, elastomeric material 102 can sit within housing 108, possibly protruding above an upper edge 120 of housing 108. However, in further embodiments, elastomeric material 102 can be contained completely within housing 108, or can have an upper portion even or flush with upper edge 120 of the housing. As shown in FIG. 1B, housing 108 suitably provides a type of holder or container for elastomeric material 102, providing structure and geometry to the elastomeric material.

As shown in FIG. 1B, electromagnetic coil 106 can be positioned below elastomeric material 102, such that when powered (e.g., by a power supply 110), a magnetic field (F1 in FIG. 1B) is produced at or through the elastomeric material. As described herein, producing the magnetic field in the direction of, or at the elastomeric material, results in a change in the mechanical and material properties of the elastomeric material, as the magnetic particles that are dispersed therein interact with the magnetic field.

As used herein "magnetic particles" refers to particles of a material that can be acted on by a magnetic field, resulting in an attraction or repulsion, depending on the direction of the magnetic field. Elastomeric materials in accordance with embodiments hereof suitably contain a plurality of magnetic particles dispersed within the material. As used herein a "plurality" of magnetic particles 104 refers to more than 1, suitably more than 5, more than 10, more than 50, more than 100, more than 1000, and for example, on the order of tens to hundreds of thousands to millions of magnetic particles dispersed within an elastomeric material. "Dispersed" as used herein refers suitably to a homogenous mixture, though a heterogeneous mixture can also be used, of magnetic particles 104 in elastomeric material 102, such that in embodiments, the elastomeric material contains magnetic particles evenly distributed (i.e., homogeneously) throughout the volume of the elastomeric material. As shown illustratively in FIGS. 1A and 1B, magnetic particles 104 are suitably distributed in an even, homogenous manner. The amount or number of magnetic particles 104 contained within the elastomeric material can also be expressed or embodied as a percentage of a volume of the elastomeric material 102. For example, magnetic particles 104 can be present from about 5% to about 70% of the volume of elastomeric material 102, including for example, about 10% to about 65%, about 20% to about 60%, about 30% to about 50%, about 30% to about 40%, or about 20%, about 30%, about 40%, about 50%, about 60%, or about 65%, of the volume of elastomeric material 102.

In exemplary embodiments, the magnetic particles can include micro-sized or nano-sized particles of magnetic materials. For example, magnetic particles 104 can be nanoparticles of magnetic materials such as, iron, nickel, cobalt, carbon iron, iron oxide, and rare-earth materials (e.g., neodymium). The term "nanoparticles" includes magnetic particles having a size of about 5-500 nm, including up to about 1 µm, though suitably in the range of about 50-300 nm, or about 50-200 nm. "Micro" sized magnetic materials suitably have a size of about 1 µm to about 50 µm, or about 1 µm to about 20 µm, or about 1 µm to about 10 µm.

Electromagnetic coil 106 is suitably a coil of a conductive fiber, such as a wire, including for example a copper coil. Electromagnetic coil 106 can be an air coil, which refers to a winding of conductive material around a non-magnetic center, including an air center. Electromagnetic coils are known in the art to refer to electrical conductors made in the shape of a coil, spiral or helix, which generate a magnetic field as the result of a current passing through the coil.

Electromagnetic coil 106 can include any suitable conductive material, and in embodiments, includes a wire of a conductive material. Examples of conductive materials include metals (such as aluminum, copper, gold and chromium), transparent conducting oxides ("TCO," such as tin-doped indium oxide ("ITO") and aluminum-doped zinc oxide ("AZO")), transparent carbon nanotubes (CNTs), transparent conducting polymers (such as Poly(3,4-ethylenedioxythiophene) ("PEDOT"), Poly(3,4-ethylenedioxythiophene):poly(styrene sulfonate) ("PEDOT:PSS") and Poly(4,4-dioctylcyclopentadithiophene)) and various conductive fibers. Additionally, electromagnetic coil 106 can be formed with conductive nanoparticles or nanowires, and can have any suitable nano-shapes or geometries, including for example silver nanowires which can act as essentially transparent conductors. Other embodiments of the coil can have a scale other than a nano-scale.

In exemplary embodiments, electromagnetic coil 106 can be planar in structure (i.e., substantially flat), or can have a thickness, generally on the order of a few hundred microns to millimeters to a few centimeters. In embodiments, electromagnetic coil 106 can be formed by a conductive wire in a planar spiral pattern with each winding having a progressively larger distance from the center portion of electromagnetic coil 106 than a prior winding.

Electromagnetic coil 106 can be formed by any suitable method. For example, a masking technique may be used, where a mask is applied to a substrate to expose the areas where a conductive material is to be deposited while the remaining areas are covered/masked. Masking can be accomplished using an adhesive tape or a developed photoresist, or any other suitable method. A layer of conductive material is then deposited on the masked substrate by chemical/physical vapor deposition or any other suitable technique. The thickness of the deposited metal can range from nanometer to micrometer scale or greater based on a magnitude of an electrical current to be used in a specific application. In another example, a conductive film can be deposited on the substrate. Portions of the film can be subsequently removed by, for example, selective etching with photolithographic techniques well known in the microelectronic industry, leaving behind the desired coil. In a further example, electromagnetic coil 106 can be printed on to a substrate using 3-dimensional printing ("3-D printing") techniques. In additional embodiments, electromagnetic coil 106 can be simply prepared by winding or turning a conductive material (e.g., wire) into the desired shape, configuration and size.

Figure 2A:
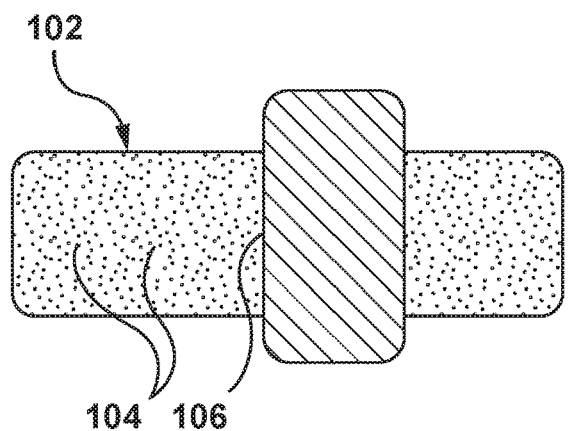
FIGS. 2A-2C show different orientations of systems for providing haptic feedback in accordance with embodiments hereof.
Figure 2B:
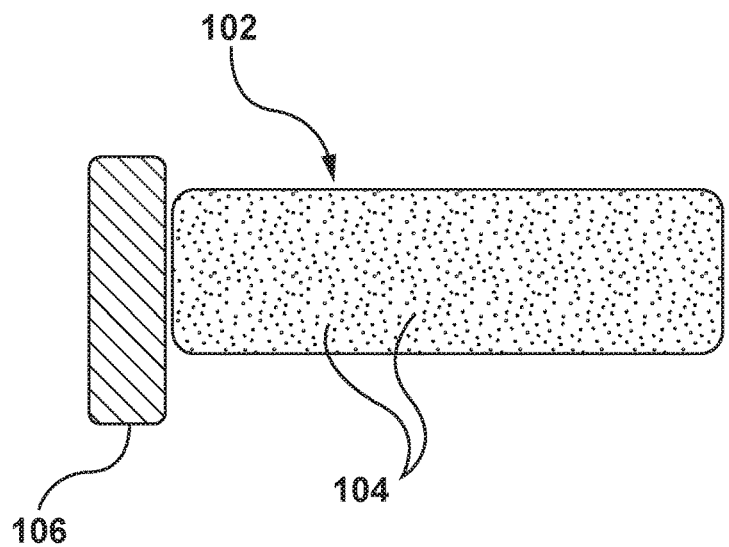
Figure 2C:
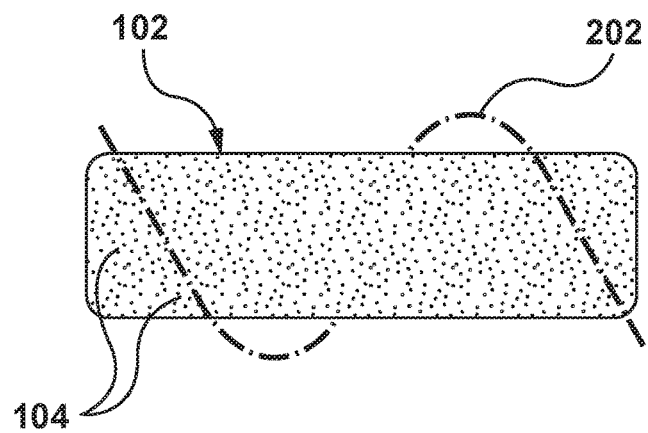

While in exemplary embodiments, as shown in FIG. 1B, electromagnetic coil 106 can be positioned beneath elastomeric material 102, other orientations are also embodied herein, so long as a magnetic field from electromagnetic coil 106 is able to act upon or interact with elastomeric material 102. For example, as shown in FIG. 2A, electromagnetic coil 106 can be placed above elastomeric material 102 (FIG. 2A represents a top view of elastomeric material 102), or in FIG. 2B, can be placed beside (on any side of) elastomeric material 102. It should be noted that the sizes of electromagnetic coil 106 and elastomeric material 102 are shown for illustrative purposes only, and their sizes, and the relationship of the sizes of the elements, is not limiting. In further embodiments, for example as shown in FIG. 2C, electromagnetic coil 106 can be wound around elastomeric material 102 or otherwise encased around elastomeric material 102. In additional embodiments, electromagnetic coil can be directly integrated or molded into elastomeric material 102, or into housing 108, to provide the magnetic field as described herein. So long as a magnetic field is able to act upon the elastomeric material 102, the orientation of electromagnetic coil 106 can be provided in any manner as desired or required.

Housing 108 can be made of any suitable material, including for example various rubbers, plastics, metals, textiles, and polymers including a soft polymeric material, such as silicone, natural rubber and synthetic rubber, or a rigid material, such as polyethylene terephthalate (PET), polycarbonate (PC) and polyethylene napthalene (PEN). Housing 108 can be of any thickness suitable for a specific application. For example, housing 108 can have a thickness ranging from a few millimeters to centimeters to tens or hundreds of centimeters. Generally, the thickness of housing 108 will be dictated by the final desired use of the systems described herein. It is noted that housing 108 in accordance with embodiments hereof can be flexible if it is sufficiently thin, even though the material it is made from may be characterized as "rigid." Depending on the application, a transparent or an opaque material can be used for the housing. The housing can be made to have other properties suitable for specific applications and/or environment. For example, a high temperature-resistant material, such as Zytel®, which is a long chain polyamide (LCPA), can be used as housing 108 if electromagnetic coil 106 or power supply 110, are expected to generate heat or be placed in a high-temperature environment.

As described herein, upon being acted upon by the magnetic field from electromagnetic coil 106, the magnetic particles undergo a change in their micro-structure or dispersion state in the elastomeric material. In response to the external magnetic field, the magnetic particles align and can change the rheology of the elastomeric material. This magneto-sensitivity property, magneto-elastomeric property, or magneto-rheological property of the elastomeric materials creates a haptic feedback to a user. The elastomeric material can, for example, change from a viscous material to a material with a higher elastic modulus, resulting in a stiffer material. This change in modulus can be felt by the user as an increase in stiffness of the elastomeric material (including housing 108 in which the elastomeric material is included), for example, as an element of a band or bracelet, or can be observed as a protrusion or pushing out of the elastomeric material from the housing or a structure which contains the elastomeric material.

In embodiments, the systems described herein further include power supply 110, for example as shown in FIG. 1B, connected to electromagnetic coil 106 (i.e., by an electrical connection or wireless power connection). Upon providing power to electromagnetic coil 106, the magnetic field, F1, is generated or produced, and directed at the elastomeric material. In embodiments, power supply 110 can be permanently connected to electromagnetic coil 106, or in other embodiments can be separated from electromagnetic coil 106 and later connected. Power supply 110 can come as an integrated component along with electromagnetic coil 106, or can be provided separately, or later provided, to supply power to electromagnetic coil 106. The amount of power provided by power supply 110 is suitably on the order of about 0.1 Watts (W) to about 10 W, or more suitably about 0.5 W to about 5 W, or about 1 W to about 5 W, or about 0.5 W, about 1 W, about 2 W, about 3 W, about 4 W or about 5 W.

In additional embodiments, electromagnetic coil 106 and/or power supply 110 can be enclosed in an encapsulating material, e.g., a water-resistant material or polymer, allowing for electromagnetic coil 106 and/or power supply 100 to come into contact with water, such as during washing of a wearable, or during wearing of a wearable article where water may be present. Exemplary materials for use as encapsulating materials include various polymers, such as rubbers, silicones, silicone elastomers, Teflon, poly(ethylene terephthalate), etc.

As described throughout, in embodiments, system 100 and/or housing 108 can be part of a structural material, and suitably can be part of a wearable. As used herein, "structural material" means a material used in constructing a wearable, personal accessory, luggage, etc. Examples of structural materials include: fabrics and textiles, such as cotton, silk, wool, nylon, rayon, synthetics, flannel, linen, polyester, woven or blends of such fabrics, etc.; leather; suede; a pliable metallic such as foil; Kevlar, etc. Examples of wearables include: clothing; footwear; prosthetics such as artificial limbs; headwear such as hats and helmets; athletic equipment worn on the body; and protective equipment such as ballistic vests, helmets, and other body armor. Personal accessories include: eyeglasses; neckties and scarfs; belts and suspenders; jewelry such as bracelets, necklaces, and watches (including watch bands and straps); wallets, billfolds, and luggage tags, etc. Luggage includes: handbags, purses, travel bags, suitcases, backpacks, including handles for such articles, etc.

In addition to wearables and structural materials, the systems described herein can be integrated into or used in combination with various devices, including for example, cellular phones, tablets, touch pads, game systems and consoles, computers, cars, etc. For example, the systems can be integrated into keyboards or touchpads, such that in response to a user touch or pressure, the elastomeric materials change in material properties, for example, changing from gel-like to solid-like, in response to a user's touch, or solid-like to gel-like after a certain threshold or time of user interaction has been reached. In embodiments where multiple sections or regions of elastomeric materials are used, the elastomeric materials can be changed in their material properties individually, or multiple sections can be changed together, depending upon the desired effect and application.

In exemplary embodiments, elastomeric material 102, including magnetic particles 104, can be prepared by dissolving a polymeric matrix in an appropriate solvent. Magnetic particles 104, such as magnetic nanoparticles or microscale magnetic particles, can then be added into the solution. If necessary the magnetic particles can be stabilized to prevent them from coagulating. For example, certain molecules can be attached, or tethered, to the magnetic particle surfaces to overcome the attractive forces between magnetic particles. The solvent can then be dried to maintain the magnetic particles in their positions.

For a non-soluble polymeric material, such as polypropylene and polyethylene, a melt mixing technique can be used to prepare elastomeric material 102. In the melt mixing, a polymer is first added to a mixing chamber and heated up to its melting temperature. The polymer melt behaves like a liquid. Then, magnetic particles 104 are added to the melt at high temperatures. The polymer melt, with the dispersed magnetic particles, can later be molded to any desired shape using hot press equipment. In embodiments where single component elastomers are utilized, it may be necessary to include additional additives, such as curing agents, plasticizers, accelerators, catalytic agents, etc.

In embodiments described herein, the fabrication methods may also require a step of orienting magnetic poles 302 of magnetic particles 104, for example as shown in FIG. 3. This is suitably carried out prior to, or during, curing, such as to align the magnetic poles (arrow indicates negative charge, plus indicates positive charge) such that they do not cancel each other out in the final elastomeric material. The aligning can generally be carried out using a permanent magnet, or other magnetic field to align the poles.

Figure 4B:
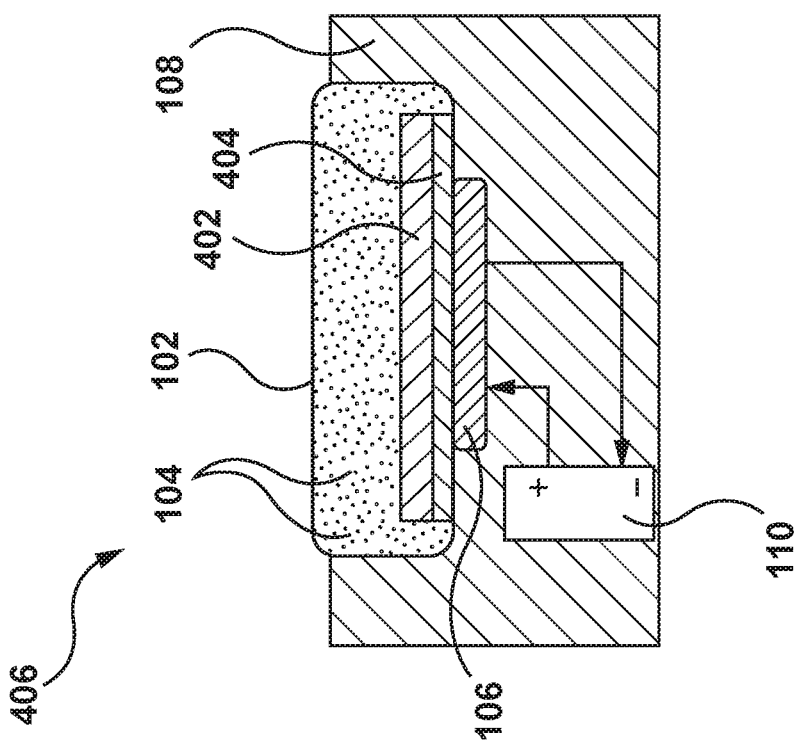
FIGS. 4A-4B show sectional views of additional systems for providing haptic feedback to a user in accordance with embodiments hereof.
Figure 4A:
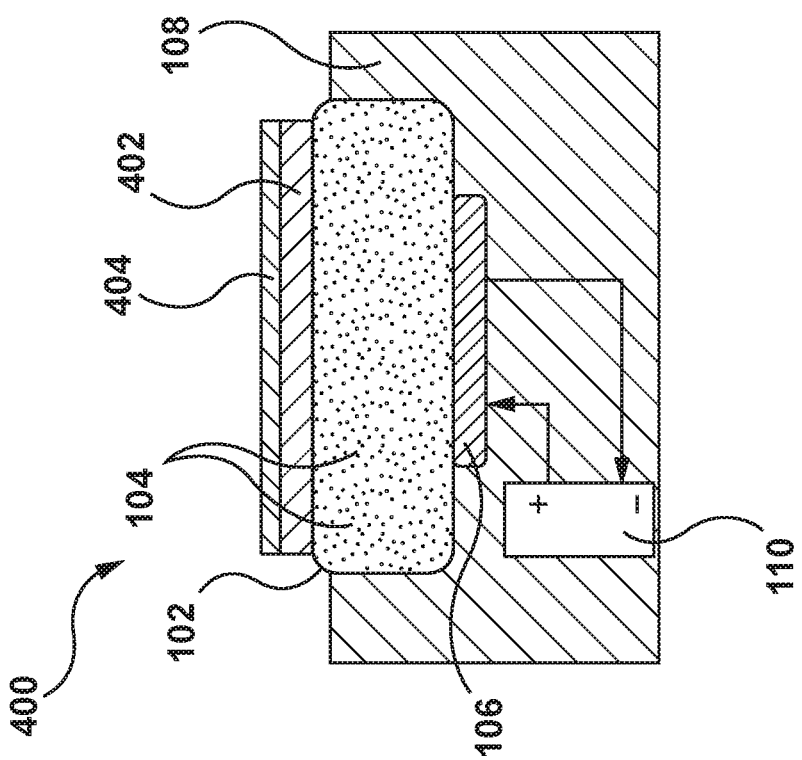

In additional embodiments, for example as shown in FIGS. 4A and 4B, the systems described herein can further comprise elements that provide an electrostatic feedback or electrostatic interaction to a user.

For example, as shown in FIG. 4A, showing a sectional view of system 400, which includes housing 108, power supply 110 connected to electromagnetic coil 106 and elastomeric material 102 including dispersed magnetic particles 104, the systems can also include a conductor 402 (suitably connected to power supply 110 or other power supply) and an insulator 404 associated with conductor 402, for providing electrostatic feedback to a user. When a user comes into close proximity to, or in contact with, insulator 404, an electrostatic interaction is felt by the user, for example in the form of a vibration (for example, in the range of about a few Hz to 10's of kHz).

FIG. 4B shows an additional embodiment, where system 406 includes housing 108, power supply 110 connected to electromagnetic coil 106 and elastomeric material 102 including dispersed magnetic particles 104, and also the system includes conductor 402 and insulator 404 associated with conductor 402, for providing electrostatic feedback to a user. In the embodiment shown in FIG. 4B, the insulator and conductor are placed near or adjacent electromagnetic coil 106, such that the electrostatic feedback or interaction will be felt through elastomeric material 102, upon a user coming into contact with or in close proximity thereto.

In exemplary embodiments, conductor 402 can be prepared from a material similar to or the same as, elastomeric material 102, but including conductive materials, for example, carbon nanotubes, graphite, carbon black, graphene, etc. Conductor 402 and insulator 404 will suitably be very thin layers (on the order of few hundred microns to tens of millimeters), so as to not interfere with a user interaction with elastomeric material 102 of the systems described herein.

Figure 5A:
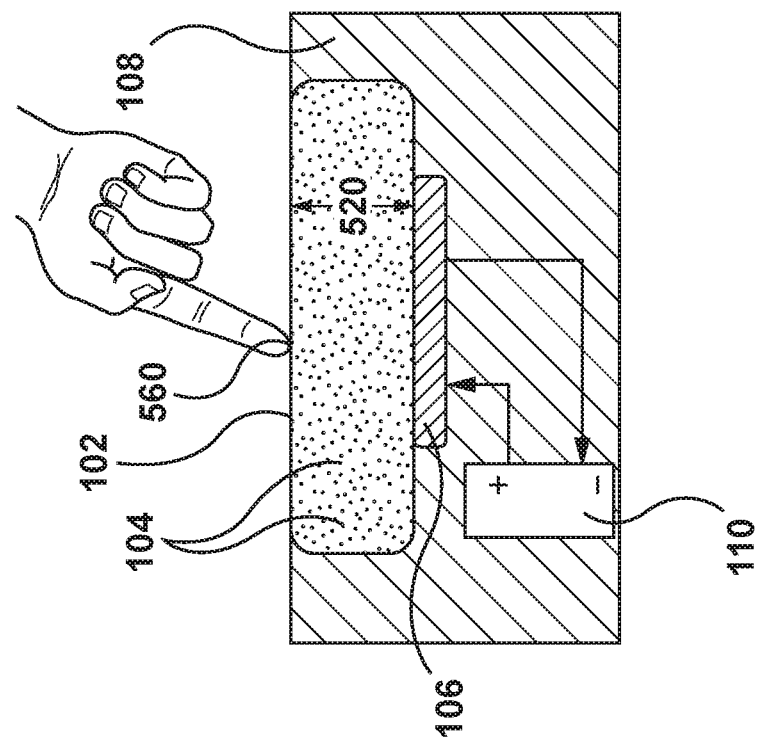
FIG. 5A shows a system as described herein providing haptic feedback to a user, in accordance with an embodiment hereof.

In further embodiments, also provided are methods for providing haptic feedback to a user via the systems described herein. As indicated, system 100 suitably includes the elastomeric material with magnetic particles dispersed therein, and the electromagnetic coil oriented so as to produce the magnetic field at the elastomeric material. In embodiments, the power supply is connected to the electromagnetic coil. The methods include, as illustrated in FIG. 5A, transmitting an activating signal 502 to the power supply. Activating signal 502 is suitably a wireless activating signal, originating from, for example, a cellular phone, tablet, computer, car interface, or game console, etc. Activating signal 502 can, for example, indicate the receipt of a telephone call, text message, e-mail, signal from a game console, and/or computer message from a car, etc. Upon receipt of the activating signal, the magnetic field is generated by electromagnetic coil 106. The magnetic field interacts with magnetic particles 104 in elastomeric material 102, which in turn causes a modification or change in the mechanical or material properties of the elastomeric material, including for example, increasing or decreasing the modulus (elastic modulus) of the elastomeric material. The modification of the material properties of the elastomeric material, including for example, increasing the modulus of the elastomeric material, provides a haptic feedback 504 to a user.

Additional examples include the systems described herein being associated with devices such as game controllers, systems or consoles, computers, tablets, car or truck interfaces or computers, automated payment machines or kiosks, various keypad devices, televisions, various machinery, etc. In such embodiments, an activating signal can be provided to an actuator drive circuit, to provide haptic feedback to a user in response to a signal originated by or from an external device. The device can also be a part of the wearable on which the various components of the haptic feedback systems described herein are contained. Exemplary feedback or signals that can be provided by a device, include, for example, indications of incoming messages or communication from a third party, warning signals, gaming interaction, driver awareness signals, computer prompts, etc.

In further embodiments, the systems described herein can be integrated with or be part of a virtual reality or augmented reality system. In such embodiments, the smart materials can provide haptic feedback to a user as he or she interacts with a virtual or augmented reality system, providing responses or feedback initiated by the virtual reality or augmented reality components and devices.

In further embodiments, a controller is also suitably included to provide an interface between the systems and devices, as described herein. Components of a controller are well known in the art, and suitably include a bus, a processor, an input/output (I/O) controller and a memory, for example. A bus couples the various components of controller, including the I/O controller and memory, to the processor. The bus typically comprises a control bus, address bus, and data bus. However, the bus can be any bus or combination of busses suitable to transfer data between components in the controller.

A processor can comprise any circuit configured to process information and can include any suitable analog or digital circuit. The processor can also include a programmable circuit that executes instructions. Examples of programmable circuits include microprocessors, microcontrollers, application specific integrated circuits (ASICs), programmable gate arrays (PGAs), field programmable gate arrays (FPGAs), or any other processor or hardware suitable for executing instructions. In the various embodiments, the processor can comprise a single unit, or a combination of two or more units, with the units physically located in a single controller or in separate devices.

An I/O controller comprises circuitry that monitors the operation of the controller and peripheral or external devices. The I/O controller also manages data flow between the controller and peripherals or external devices. Examples of peripheral or external devices with the which I/O controller can interface include switches, sensors, external storage devices, monitors, input devices such as keyboards, mice or pushbuttons, external computing devices, mobile devices, and transmitters/receivers.

The memory can comprise volatile memory such as random access memory (RAM), read only memory (ROM), electrically erasable programmable read only memory (EERPOM), flash memory, magnetic memory, optical memory or any other suitable memory technology. Memory can also comprise a combination of volatile and nonvolatile memory.

The memory is configured to store a number of program modules for execution by the processor. The modules can, for example, include an event detection module, an effect determination module, and an effect control module. Each program module is a collection of data, routines, objects, calls and other instructions that perform one or more particular task. Although certain program modules are disclosed herein, the various instructions and tasks described for each module can, in various embodiments, be performed by a single program module, a different combination of modules, modules other than those disclosed herein, or modules executed by remote devices that are in communication with the controller.

In embodiments described herein, the controller, which can include a wireless transceiver (including a Bluetooth or infrared transceiver), can be integrated into the structural materials describe herein, or separate from the structural material. In further embodiments, the controller can be on a separate device from the structural material, but is suitably connected via a wired or more suitably a wireless signal, so as to provide activating signal 302 to the various components of the systems and smart materials described herein.

In exemplary embodiments, the electromagnetic coil can be operated with an alternating power supply, causing a rapid change in the magnetic field generated thereby. Such an oscillating, rapidly changing magnetic field from one polarity to the other, can, cause the elastomeric material to change properties quickly (on the order to a few to tens of milliseconds from one material state to another), which generates a vibrational haptic feedback to the user. The frequency of this vibrational haptic feedback can be on the order of about 10 Hz to about 1 kHz, or about 100 Hz to about 1 kHz, etc.

Figure 5B:
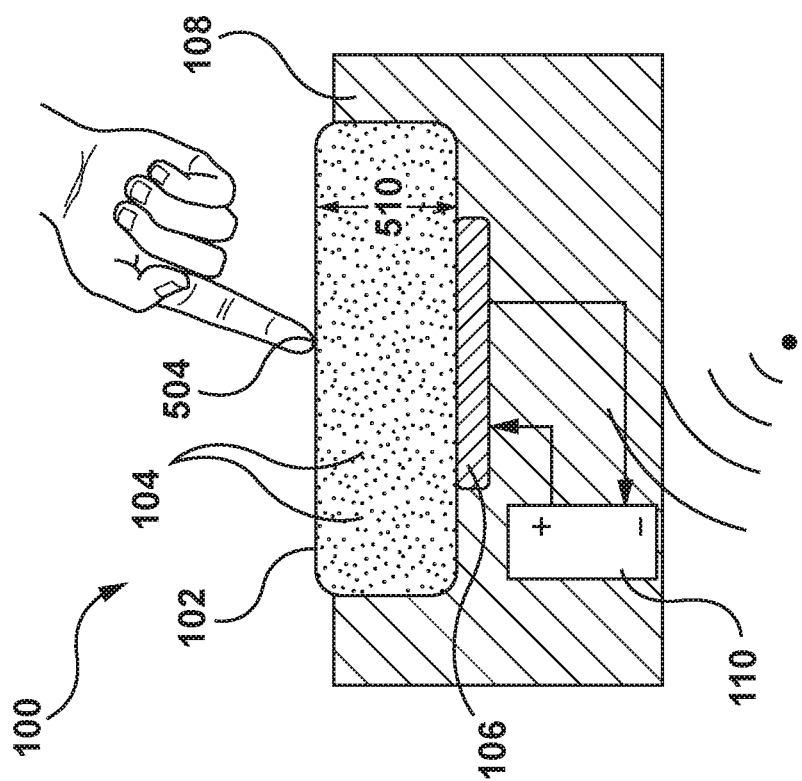
FIG. 5B shows a system as described herein acting as a sensor, in accordance with an embodiment hereof.

In a further embodiment, as illustrated in FIG. 5B, user interaction 560 can cause elastomeric material 102 containing magnetic particles 104 to compress or change shape (e.g. from original shape 510 in FIG. 5A to a modified, compressed shape 520 in FIG. 5B. This change in shape or compression can result in a measurable change in an electromotive force associated with the system, such that the system can be used as a sensor that measures a user interaction. The user interaction can also modify the position of electromagnetic coil 106, which in turn impacts the scale or size of an electromotive force. The change in electromotive force can be measured as a change in voltage or magnetic flux between the electromagnetic coil and the elastomeric material containing the magnetic particles. This "back" electromotive force, i.e., in response to the interaction of the user, can be translated into a pressure measurement, for use as a pressure sensor. In addition, using the systems described herein as sensors can be further integrated with various electronics. Through such electronics, user input or interaction with a device (e.g., phone, game system, computer, etc.) can be determined though the change in electromotive force, and then translated to the device as user feedback. Additional sensor elements, e.g., resistive, capacitive, ultraviolet or light-based sensors can also be integrated with the systems, such that the systems herein can act as both actuators and sensors, together.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for providing haptic feedback to a user, comprising:
   a. an elastomeric material;
   b. magnetic particles dispersed in the elastomeric material; and
   c. an electromagnetic coil oriented so as to produce a magnetic field at the elastomeric material.

2. The system of claim 1, further comprising: a housing containing the elastomeric material and the electromagnetic coil.

3. The system of claim 2, wherein the housing is part of a wearable.

4. The system of claim 1, wherein the electromagnetic coil comprises copper.

5. The system of claim 1, wherein the electromagnetic coil comprises a conductive fiber.

6. The system of claim 1, wherein the magnetic particles comprise nanoparticles of magnetic material.

7. The system of claim 1, wherein the elastomeric material comprises a rubber, a urethane, a silicone or an acrylic.

8. The system of claim 1, further comprising: a power supply connected to the electromagnetic coil.

9. The system of claim 1, further comprising: a conductor and an insulator associated with the conductor for providing an electrostatic feedback to the user.

10. The system of claim 1, wherein magnetic poles of the magnetic particles are aligned.

11. A system for providing haptic feedback to a user, comprising:
    a. an elastomeric material;
    b. magnetic particles dispersed in the elastomeric material;
    c. an electromagnetic coil oriented so as to produce a magnetic field at the elastomeric material;
    d. a power supply connected to the electromagnetic coil; and
    e. a housing containing the elastomeric material, the electromagnetic coil and the power supply.

12. The system of claim 11, wherein the magnetic particles comprise nanoparticles of magnetic material.

13. The system of claim 11, wherein the elastomeric material comprises a rubber, a urethane, a silicone or an acrylic.

14. The system of claim 11, wherein magnetic poles of the magnetic particles are aligned.

15. The system of claim 11, comprising multiple sections of elastomeric material within the housing.

16. A method for providing haptic feedback to a user via a system, the method comprising:
   i. providing a system including,
   a. an elastomeric material,
   b. magnetic particles dispersed in the elastomeric material,
   c. an electromagnetic coil oriented so as to produce a magnetic field at the elastomeric material, and
   d. a power supply connected to the electromagnetic coil;
   i. transmitting an activating signal to the power supply;
   ii. generating a magnetic field with the electromagnetic coil; and
   iii. modifying a modulus of the elastomeric material in response to the magnetic field to provide haptic feedback to the user.

17. The method of claim 16, wherein the generating comprises generating an oscillating magnetic field resulting in a vibrational haptic feedback to the user.

18. The method of claim 17, wherein the vibrational haptic feedback occurs a frequency of about 100 Hz to about 1 kHz.

19. The method of claim 16, further comprising: measuring an electromotive force as a result of the user interacting with the elastomeric material or the electromagnetic coil.

20. The method of claim 16, wherein the modulus of the elastomeric material is increased.

* * * * *